BRIDGE FEEDBACK MODULATOR
Filed Oct. 18, 1961
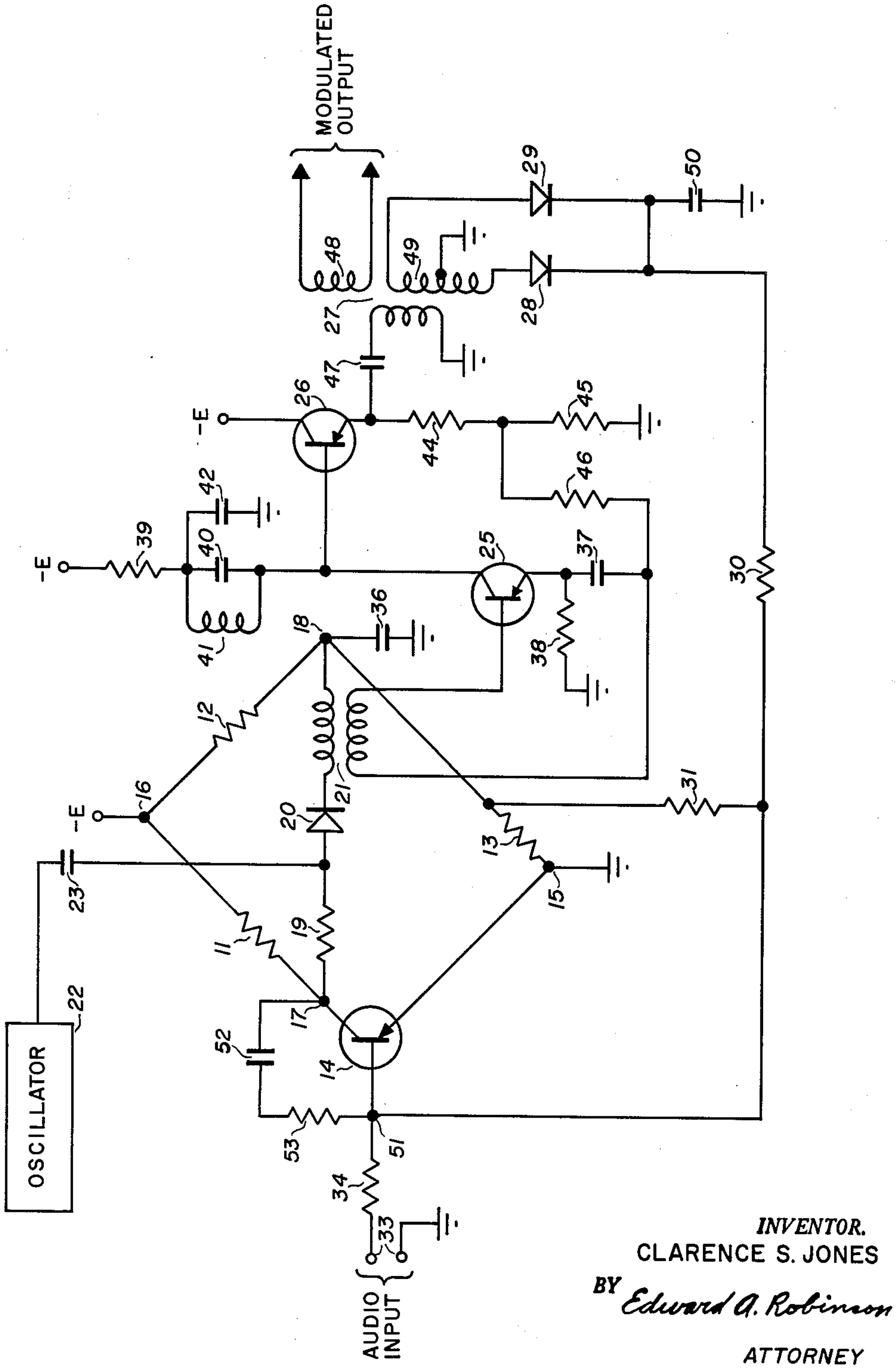
INVENTOR.
CLARENCE S. JONES
BY Edward A. Robinson
ATTORNEY United States Patent Office 3,100,286

Patented Aug. 6, 1963

3,100,286

BRIDGE FEEDBACK MODULATOR

Clarence S. Jones, Los Altos, Calif., assignor to General Precision, Inc., Binghamton, N.Y., a corporation of Delaware Filed Oct. 18, 1961, Ser. No. 145,881
5 Claims. (Cl. 332—37)

This invention relates to amplitude modulation circuits, and more particularly, to such circuits making use of semiconductor devices which may be inherently non-linear in character.

Modulation generally is an alteration of one or more of the characteristics of a carrier signal as a function of another signal. In amplitude modulation, the instantaneous amplitude of a carrier wave is varied in proportion to the modulating signal. The modulating signal may be a single frequency, or it may comprise many frequencies of various amplitudes and phases such as the audio waves of speech. Although the modulation of a carrier signal may be accomplished by non-linear devices, it is desirable that the envelope of the modulated carrier be identical to the modulation signals to avoid distortion.

It is an object of this invention to provide an improved modulation circuit having good linearity such that the output wave will contain neither harmonics of the carrier frequency nor audio sub-carrier frequencies, and more particularly, it is an object to provide such a circuit having characteristics that are essentially independent of particular components which may be used in the circuit.

It is another object of this invention to provide an improved modulation circuit having a bridge arrangement for developing a modulated output signal and having feedback paths for passing the modulation signal to the input of the bridge both from a point of the bridge circuit itself and from a coupling with the modulated output.

Other objects and many attendant advantages of this invention may be appreciated and better understood by reference to the following detailed description considered in connection with the accompanying drawing, the single FIGURE of which is a schematic diagram of the modulation circuit of this invention.

Briefly stated, according to a preferred embodiment of this invention, the modulation circuit includes a bridge network having three resistors 11, 12 and 13 and a transistor 14 coupled together. A voltage source is essentially connected diagonally across the bridge between point 15 which is grounded and an opposite point 16 which is coupled to a negative supply voltage —E. The other diagonal of the bridge between points 17 and 18 includes a resistor 19, a diode 20 and the primary winding of a transformer 21. A carrier signal is generated by an oscillator 22 and is passed to the diode 20 via a capacitor 23. A modulated carrier signal is developed across the diode 20 and is coupled via the transformer 21 to be amplified by transistors 25 and 26 and passed to an output transformer 27. To linearize the wave form of the modulated output signal, a pair of diodes 28 and 29 demodulate the signal which is fed back to the transistor 14 via a resistor 30; a resistor 31 provides further feedback directly from the bridge circuit itself.

The audio signals impressed upon input terminals 33 are passed to the base electrode of the transistor 14 via a resistor 34. A transistor 14 constitutes one leg of the bridge circuit between the points 15 and 17, and the impedance of the transistor 14 will vary at the rate of the input signal causing a varying unbalance of the bridge. As the balance of the bridge varies, current of the modulating signal will flow across the diagonal leg through the resistor 19, the diode 20 and the primary winding of the transformer 21, and the diode 20 will present an impedance to the flow of the carrier signal which varies with the modulating signal.

The carrier signal is generated by the oscillator 22 which may be any conventional type of radio frequency oscillator, for example, an oscillator circuit may be used which is disclosed in a co-pending patent application, Serial No. 15,914, entitled "Crystal Controlled Transistorized Oscillator," filed on March 18, 1960, by Clarence S. Jones and John Scarbrough. The carrier signal is passed from the oscillator 22 through the capacitor 23, the diode 20, the primary winding of the transformer 21 to the point 18, and thence via a capacitor 36 to a ground return to the oscillator. The carrier current is primarily limited by the forward resistance of the diode 20 which varies in accordance with the audio input current applied to the audio input terminal 33 and applied to bias the transistor 14. Thus, the amplitude of the carrier signal which flows through the diode 20 and the primary winding of the transformer 21 will vary at the audio rate, and the voltage induced in the secondary winding of the transformer 21 will be a modulated carrier signal.

The modulated carrier signal from the transformer 21 is impressed upon the base electrode of the transistor 25 which amplifies this signal. A capacitor 37 provides a return path for the carrier signal in the emitter circuit of the transistor 25, and a resistor 38 provides a direct current path from the emitter to ground. The collector electrode of the transistor 25 is coupled to a source of negative potential by a load impedance which includes a resistor 39 and a filter circuit having a capacitor 40 and an inductance 41. Another capacitor 42 provides a path to ground for high frequency signals. The filter circuit 40—41 may be broadly tuned to the frequency of the carrier signal generated by the oscillator 22, whereby the transistor 25 constitutes a selective amplifier for passing the modulated carrier signal and for attenuating harmonics thereof. The transistor 26 constitutes an emitter follower for providing a low impedance output and is directly coupled to the collector electrode of the transistor 25. The emitter electrode of the transistor 26 is coupled to ground by serially connected resistors 44 and 45. A resistor 46 provides a negative feedback loop from the emitter circuit of the transistor 26, through the secondary winding of the transformer 21, to the base electrode of the transistor 25.

The modulated output signal is passed from the emitter electrode of the transistor 26 via a capactor 47 to the primary winding of the output transformer 27. A first secondary winding 48 of the transformer 27 provides an output circuit therefrom, and another secondary winding 49 is provided with a grounded center tap and is coupled to the diodes 28 and 29. A capacitor 50 coupled to both diodes 28 and 29 provides a filtering action for attenuating the carrier frequency while the audio or modulation frequency is passed via the resistor 30 to the input junction or base electrode of the transistor 14. It may be appreciated that the second transformer winding 49, the diodes 28 and 29 and the capactor 50 constitute a demodulation circuit for obtaining the modulation signal from the moduallted carrier output signal.

Although the input signal heretofore has been referred to as an "audio" input, this circuit need not be restricted to frequencies which are ordinarily considered in the audio range. Indeed, a circuit in accordance with the teaching of this invention has been constructed wherein the modulation input signal approaches the frequency of the oscillator 22, and differs therefrom by a mere factor of 5. Thus, the carrier frequency was modulated by a signal which had a frequency of ⅕ of that of the carrier. The transformers 21 and 27 and the inductance 41 are shown with air cores, but ferite core elements may be used if the carrier frequency is not great.

The point 51 coupled to the base electrode of the transistor 14 constitutes the input summing junction and signals are received from several sources. The audio input signals are passed by the resistor 34, negative feedback audio signals are passed by the resistor 30, and further negative feedback signals are passed by the resistor 31. In a practical embodiment of this invention, the resistor 31 was substantially greater in value than the resistor 30 such that the principal negative feedback was derived from the final output transformer 27, and the signals passed by the resistor 31 provided a lesser feedback for the purpose of stabilizing the bridge circuit. An RC network including a capacitor 52 and a resistor 53 provides a strong negative feedback path for the higher frequencies around the transistor 14, and thereby attenuates the high frequencies which may otherwise be amplified by the transistor 14.

In the exemplary circuit which has been constructed, carrier frequencies ranging from 50 kilocycles to 1 megocycle were modulated with sub-carrier input signals having bandwidths up to 20% of the carrier frequency. Although the diode 20 and the transistors 14, 25 and 26 may be non-linear and may have characteristics which vary with age, the output modulated waveform has been found to be linear due to the servo effect of the negative feedback paths, and principally to the overall feedback path including the demodulation diodes 28 and 29 and the resistor 30.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A modulation system comprising a bridge network having four impedance legs, one of said impedance legs including a transistor for receiving audio input signals, an impedance branch coupled across the bridge including a unidirectional conduction device, a means for generating a carrier signal coupled to the unidirectional conduction device, a means for passing a modulated carrier signal from the unidirectional conduction device, an output circuit coupled to said means for passing the modulated carrier signal, a de-modulation means coupled to the output circuit, and a negative feedback path for passing audio signals from de-modulation means to the transistor.

2. A modulation system comprising a transistor for receiving audio input signals, a first resistor, a second resistor and a third resistor, said transistor and said first, second and third resistors being connected together to form a bridge network, an impedance circuit coupled across the bridge network including a diode, a means for generating a carrier signal coupled to the diode, a means for passing a modulated carrier signal from the diode, amplifying means having an output circuit coupled to said means for passing the modulated carrier signal, a demodulation means coupled to the output circuit for separating the audio signals from the modulated carrier signal, and a negative feedback path coupled between the demodulation means and the transistor for linearizing the audio signal as modulated upon the carrier signal.

3. A modulation system comprising a transistor for receiving audio input signals, a first resistor, a second resistor and a third resistor, said transistor and said first, second and third resistors being connected together to form a bridge network, an impedance circuit coupled across the bridge network including a diode and a primary winding of a transformer, an oscillator for generating a carrier signal coupled to the diode of the impedance circuit, a secondary winding of the transformer for passing a modulated carrier signal from the impedance circuit, amplifying means coupled to the secondary winding of the transformer and operable to pass the modulated carrier signal to an output circuit, a de-modulation means coupled to the output circuit for separating the audio signals from the modulated carrier signal, a first negative feedback path coupled between the primary winding of the transformer and the transistor, and a second negative feedback path coupled between the de-modulation means and the transistor.

4. A modulation system comprising a transistor for receiving audio input signals, a first resistor, a second resistor and a third resistor, said transistor and said first, second and third resistors being connected together to form a bridge network, an impedance circuit coupled across the bridge network including a resistor, a diode and a coupling transformer having a primary and a secondary winding, said resistor, said diode, and the primary winding of the coupling transformer being connected in series and being connected as a diagonal leg across the bridge, an oscillator for generating a carrier signal coupled to the impedance circuit at the series connection point between the resistor and the diode, an amplifying circuit coupled to the secondary winding of the coupling transformer and operable to pass a modulated carrier signal, an output transformer having a primary winding and a first and a second secondary winding, the primary winding of the output transformer being coupled to the amplifying circuit, the first secondary winding of the output transformer being operable to pass the modulated carrier signal, a demodulation circuit coupled to the second secondary winding of the output transformer, a first negative feedback path coupled between the primary winding of the coupling transformer and the transistor, and a second negative feedback path coupled between the de-modulation circuit and the transistor.

5. The modulation system in accordance with claim 4 wherein the de-modulation circuit comprises a pair of diodes each coupled to opposite ends of the second secondary winding of the output transformer, and a capacitor coupled to both diodes for attenuating signals of the carrier frequency and harmonics thereof and for passing the audio frequency to the second feedback path.

References Cited in the file of this patent

UNITED STATES PATENTS

| | | |
|---|---|---|
| 2,227,505 | Kummerer | Jan. 7, 1941 |
| 2,250,571 | Buschbeck | July 29, 1941 |
| 2,912,638 | McNamee | Nov. 10, 1959 |